(12) United States Patent
Beard et al.

(10) Patent No.: US 10,592,424 B2
(45) Date of Patent: *Mar. 17, 2020

(54) RANGE-BASED MEMORY SYSTEM

(71) Applicant: Arm Limited, Cambridge (GB)

(72) Inventors: Jonathan Curtis Beard, Austin, TX (US); Stephan Diestelhorst, Cambridge (GB)

(73) Assignee: Arm Limited, Cambridge (GB)

( * ) Notice: Subject to any disclaimer, the term of this patent is extended or adjusted under 35 U.S.C. 154(b) by 121 days.

This patent is subject to a terminal disclaimer.

(21) Appl. No.: 15/819,378

(22) Filed: Nov. 21, 2017

(65) Prior Publication Data

US 2019/0018786 A1 Jan. 17, 2019

Related U.S. Application Data

(63) Continuation-in-part of application No. 15/650,056, filed on Jul. 14, 2017.

(51) Int. Cl.
*G06F 12/1009* (2016.01)
*G06F 12/0817* (2016.01)
(Continued)

(52) U.S. Cl.
CPC ........ *G06F 12/1009* (2013.01); *G06F 12/082* (2013.01); *G06F 12/084* (2013.01);
(Continued)

(58) Field of Classification Search
CPC ............... G06F 3/00; G06F 3/06–0689; G06F 5/00–16; G06F 9/00–548;
(Continued)

(56) References Cited

U.S. PATENT DOCUMENTS 4,347,565 A 8/1982 Kaneda et al.
4,792,897 A 12/1988 Gotou et al.
(Continued)

FOREIGN PATENT DOCUMENTS

EP 3 128 415 2/2017
WO WO 2016/160220 10/2016
(Continued)

OTHER PUBLICATIONS

Range Translations for Fast Virtual Memory; Gandhi et al.; IEEE Micro, col. 36, iss. 3, pp. 118-126; Mar. 18, 2016 (Year: 2016).*
(Continued)

*Primary Examiner* — Daniel C. Chappell
(74) *Attorney, Agent, or Firm* — Leveque IP Law, P.C.

(57) ABSTRACT

A mechanism is provided for efficient coherence state modification of cached data stored in a range of addresses in a coherent data processing system in which data coherency is maintained across multiple caches. A tag search structure is maintained that identifies address tags and coherence states of cached data indexed by address tags. In response to a request from a device internal to or external from the coherence network, the tag search structure is searched to identify address tags of cached data for which the coherence state is to be modified and requests are issued in the data processing system to modify a coherence state of cached lines with the identified address tags. The request from the external device may specify a range of addresses for which a coherence state change is sought. The tag search structure may be implemented as search tree, for example.

21 Claims, 10 Drawing Sheets

(51) Int. Cl.
*G06F 12/084* (2016.01)
*G06F 12/1045* (2016.01)
*G06F 12/109* (2016.01)

(52) U.S. Cl.
CPC ........ *G06F 12/109* (2013.01); *G06F 12/1063* (2013.01); *G06F 2212/283* (2013.01); *G06F 2212/621* (2013.01); *G06F 2212/651* (2013.01); *G06F 2212/652* (2013.01); *G06F 2212/656* (2013.01); *G06F 2212/657* (2013.01); *G06F 2212/682* (2013.01)

(58) Field of Classification Search
CPC ..... G06F 11/00–3696; G06F 12/00–16; G06F 2212/00–7211
See application file for complete search history.

(56) References Cited

U.S. PATENT DOCUMENTS

| | | | |
|---|---|---|---|
| 5,008,813 A * | 4/1991 | Crane | G06F 12/0831 711/100 |
| 5,361,337 A | 11/1994 | Okin | |
| 5,426,750 A | 6/1995 | Becker et al. | |
| 5,577,231 A | 11/1996 | Scalzi et al. | |
| 5,752,275 A | 5/1998 | Hammond | |
| 5,867,649 A | 2/1999 | Larson | |
| 6,021,476 A | 2/2000 | Segars | |
| 6,345,241 B1 | 2/2002 | Brice | |
| 6,349,355 B1 | 2/2002 | Draves et al. | |
| 6,633,963 B1 | 10/2003 | Ellison et al. | |
| 6,704,873 B1 | 3/2004 | Underwood | |
| 6,715,145 B1 | 3/2004 | Bowman-Amuah | |
| 6,731,288 B2 | 5/2004 | Parsons | |
| 6,751,720 B2 * | 6/2004 | Barroso | G06F 12/0826 365/230.01 |
| 6,789,156 B1 | 9/2004 | Waldspurger | |
| 6,822,959 B2 | 11/2004 | Galbi et al. | |
| 6,848,023 B2 * | 1/2005 | Teramoto | G06F 12/082 711/127 |
| 7,181,594 B2 | 2/2007 | Wilkinson, I et al. | |
| 7,225,300 B1 | 5/2007 | Choquette et al. | |
| 7,343,603 B1 | 3/2008 | Fresko | |
| 7,356,667 B2 | 4/2008 | Harris et al. | |
| 7,366,847 B2 * | 4/2008 | Kruckemyer | G06F 12/082 711/141 |
| 7,373,466 B1 * | 5/2008 | Conway | G06F 12/082 711/156 |
| 7,424,599 B2 | 9/2008 | Kissell et al. | |
| 7,437,724 B2 | 10/2008 | Wolrich et al. | |
| 7,472,253 B1 | 12/2008 | Cameron et al. | |
| 7,512,769 B1 | 3/2009 | Lowell et al. | |
| 7,668,165 B2 | 2/2010 | Hoskote | |
| 8,250,519 B2 | 8/2012 | Budko et al. | |
| 8,327,187 B1 | 12/2012 | Metcalf | |
| 8,386,745 B2 | 2/2013 | Kegel et al. | |
| 8,656,397 B2 | 2/2014 | Eidus et al. | |
| 8,667,249 B2 | 3/2014 | Baxter et al. | |
| 8,850,168 B2 | 9/2014 | Yamamoto et al. | |
| 8,984,255 B2 | 3/2015 | Hsu et al. | |
| 9,081,501 B2 | 7/2015 | Asaad et al. | |
| 9,081,706 B2 | 7/2015 | Koka et al. | |
| 9,122,714 B2 | 9/2015 | Varadarajan et al. | |
| 9,208,103 B2 | 12/2015 | Kessler et al. | |
| 9,235,529 B2 | 1/2016 | Koka et al. | |
| 9,250,901 B2 | 2/2016 | Sodhi et al. | |
| 9,251,089 B2 | 2/2016 | Gschwind | |
| 9,268,694 B2 | 2/2016 | Snyder et al. | |
| 9,367,459 B2 | 6/2016 | Yamashita et al. | |
| 9,582,312 B1 | 2/2017 | Karppanen | |
| 9,639,476 B2 | 5/2017 | Chin et al. | |
| 9,645,941 B2 | 5/2017 | Mukherjee et al. | |
| 9,690,714 B1 | 6/2017 | Sites | |
| 9,785,557 B1 | 10/2017 | Frey et al. | |
| 9,996,386 B2 | 6/2018 | Rauchfuss et al. | |
| 10,037,227 B2 | 7/2018 | Therien et al. | |
| 10,067,743 B2 * | 9/2018 | Ishii | G06F 12/0804 |
| 10,114,958 B2 | 10/2018 | Sell | |
| 10,133,675 B2 | 11/2018 | Hansson et al. | |
| 10,180,913 B1 | 1/2019 | Kingaran et al. | |
| 10,210,117 B2 * | 2/2019 | Gittins | G06F 13/1663 |
| 10,282,310 B2 * | 5/2019 | Ishii | G06F 12/0806 |
| 2002/0026502 A1 | 2/2002 | Phillips | |
| 2004/0064668 A1 | 4/2004 | Kjos et al. | |
| 2004/0117593 A1 | 6/2004 | Uhlig et al. | |
| 2004/0215893 A1 | 10/2004 | Emerson et al. | |
| 2005/0010728 A1 | 1/2005 | Piry et al. | |
| 2005/0165758 A1 | 7/2005 | Kasten et al. | |
| 2005/0138515 A1 | 8/2005 | Hyduke | |
| 2005/0273571 A1 | 12/2005 | Lyon et al. | |
| 2006/0253894 A1 | 11/2006 | Bookman | |
| 2006/0277390 A1 | 12/2006 | Zuraski et al. | |
| 2006/0288177 A1 | 12/2006 | Shaw | |
| 2007/0180197 A1 | 8/2007 | Wright et al. | |
| 2007/0186054 A1 | 8/2007 | Kruckmeyer et al. | |
| 2008/0104557 A1 | 5/2008 | Gopaladrishnan et al. | |
| 2008/0270653 A1 | 10/2008 | Balle et al. | |
| 2009/0089537 A1 | 4/2009 | Vick et al. | |
| 2009/0113164 A1 | 4/2009 | Rajamony et al. | |
| 2009/0172343 A1 | 7/2009 | Savagaonkar | |
| 2009/0182971 A1 | 7/2009 | Greiner et al. | |
| 2009/0234987 A1 | 9/2009 | Lee et al. | |
| 2011/0113410 A1 | 5/2011 | Loen | |
| 2011/0145542 A1 | 6/2011 | Morrow | |
| 2011/0208935 A1 | 8/2011 | Grisenthwaite | |
| 2012/0324148 A1 | 12/2012 | Stonelake et al. | |
| 2013/0179666 A1 | 7/2013 | Yamashita et al. | |
| 2013/0227248 A1 | 8/2013 | Mehta et al. | |
| 2014/0006734 A1 | 1/2014 | Li et al. | |
| 2014/0013074 A1 | 1/2014 | Koka | |
| 2014/0052917 A1 | 2/2014 | Koka et al. | |
| 2014/0208064 A1 | 7/2014 | Basu et al. | |
| 2014/0281363 A1 | 9/2014 | Tian | |
| 2014/0351519 A1 | 11/2014 | Munoz | |
| 2015/0106571 A1 | 4/2015 | Bernard et al. | |
| 2015/0205885 A1 | 7/2015 | Zhou et al. | |
| 2015/0254104 A1 | 9/2015 | Kessler et al. | |
| 2015/0286639 A1 | 10/2015 | Bordawekar | |
| 2015/0301949 A1 | 10/2015 | Koka et al. | |
| 2015/0301951 A1 | 10/2015 | Bybell et al. | |
| 2015/0325272 A1 | 11/2015 | Murphy | |
| 2016/0085677 A1 * | 3/2016 | Loh | G06F 12/0815 711/143 |
| 2016/0147555 A1 | 5/2016 | Hepkin | |
| 2016/0147620 A1 | 5/2016 | Lesartre et al. | |
| 2016/0239415 A1 | 8/2016 | David et al. | |
| 2016/0283399 A1 | 9/2016 | Das | |
| 2017/0031832 A1 | 2/2017 | Hwang | |
| 2017/0109289 A1 | 4/2017 | Gonzalez | |
| 2017/0147254 A1 | 5/2017 | Adams et al. | |
| 2017/0153987 A1 | 6/2017 | Gaonkar et al. | |
| 2017/0161194 A1 | 6/2017 | Loh | |
| 2017/0177484 A1 * | 6/2017 | Conway | G06F 12/0895 |
| 2017/0185528 A1 | 6/2017 | Hansson et al. | |
| 2017/0236243 A1 | 8/2017 | Smith | |
| 2017/0286421 A1 | 10/2017 | Hayenga et al. | |
| 2018/0018278 A1 | 1/2018 | Bradbury et al. | |
| 2018/0150315 A1 | 5/2018 | Dunham et al. | |
| 2018/0150321 A1 | 5/2018 | Dunham et al. | |
| 2018/0150322 A1 | 5/2018 | Dunham et al. | |

FOREIGN PATENT DOCUMENTS

| | | |
|---|---|---|
| WO | WO 2016/162817 | 10/2016 |
| WO | WO 2016/204913 | 12/2016 |

OTHER PUBLICATIONS

Bang, Kwanhu & Park, Sang-Hoon & Jun, Minje & Chung, Eui-Young. (2011). A memory hierarchy-aware metadata management technique for Solid State Disks. Midwest Symposium on Circuits and Systems. 1-4.

(56) References Cited

OTHER PUBLICATIONS

C. H. Park, T. Heo, J. Jeong and J. Huh, "Hybrid TLB coalescing: Improving TLB translation coverage under diverse fragmented memory allocations," 2017 ACM/IEEE 44th Annual International Symposium on Computer Architecture (ISCA), Toronto, ON, 2017, pp. 444-456.

Chao-Jui Chang, Jan-Jan Wu, Wei-Chung Hsu, Pangfeng Liu, and Pen-Chung Yew. 2014. Efficient memory virtualization for Cross-ISA system mode emulation. SIGPLAN Not. 49, 7 (Mar. 2014), 117-128.

Grocutt et al., U.S. Appl. No. 15/825,524 unpublished application, filed Nov. 29, 2017.

L. Fiorin, G. Palermo, S. Lukovic, V. Catalano and C. Silvan, "Secure Memory Accesses on Networks-on-Chip," in IEEE Transactions on Computers, vol. 57, No. 9, pp. 1216-1229, Sep. 2008.

M. D. Flouris and A. Bilas, "Violin: a framework for extensible block-level storage," 22nd IEEE / 13th NASA Goddard Conference on Mass Storage Systems and Technologies (MSST'05), Monterey, CA, USA, 2005, pp. 128-142.

Porquet, J & Greiner, A & Schwarz, C., "NoC-MPU: A secure architecture for flexible co-hosting on shared memory MPSoCs," Design, Automation & Test. in Europe, 1-4, 2001.

Sambit K. Shukla, Laxmi N. Bhuyan, "A hybrid shared memory heterogenous execution platform for PCIe-based GPGPUs," 2013 20th International Conference on High Performance Computing (HiPC), vol. 1, pp. 343-352, 2013.

T. Wood et al., "CloudNet: Dynamic Pooling of Cloud Resources by Live WAN Migration of Virtual Machines," in IEEE/ACM Transactions on Networking, vol. 23, No. 5, pp. 1568-1583, Oct. 2015.

U.S. Appl. No. 15/825,524, filed Nov. 29, 2017, Inventor: Grocutt et al.

Arm, "ARMv8-A Address Translation," https://static.docs.arm.com/100940/0100/armv8_a_address%20translation_100940_0100_en.pdf, Feb. 28, 2017.

Yang, Junfeng, "Process and Address Space," https://web.archive.org/web/20170329090956if_/http://www.cs.columbia.edu:80/"junfeng/12sp-w4118/lectures/104-proc.pdf, Mar. 29, 2017.

Anonymous, "Fork (system call)," https://web.archive.org/web/20150124080230/https://en.wikipedia.org/wiki/Fork_(system_call), Jan. 24, 2015.

Oehmke, David W., Nathan L. Binkert, Steven K. Reinhardt and Trevor J Mudge. "Design and Applications of a Virtual Context Architecture." (2004).

Jayneel Gandhi, "Efficient Memory Virtualization," Thesis, University of Wisconsin-Madison, Aug. 19, 2016.

Memory Management Basics, www.idc-online.com/technical_references/pdfs/information_technology/Memory_Management_Basics.pdf, 2014.

Thong Shao, CS422/522 Design & Implementation of Operating Systems Lecture 13: Address Translation, Yale University, Oct. 15, 2015, https://web.archive.org/web/20151217223456/http://fint.cs.yale.edu/cs422/lectureNotes/L13,pdf.

Rouse, Margaret, Definition translation lookaside buffer (TLB), https://whatis.techtarget.com/definition/translation-look-aside-buffer-TLB, Sep. 2014.

U.S. Appl. No. 15/361,871, filed Nov. 28, 2016 entitled "Data Processing", Applicant Arm Ltd.

U.S. Appl. No. 15/361,819, filed Nov. 28, 2016 entitled "Data Processing", Applicant Arm Ltd.

U.S. Appl. No. 15/361,770, filed Nov. 28, 2016 entitled "Data Processing", Applicant Arm Ltd.

Anedda et al., "Suspending, migrating and resuming HPC virtual clusters," Future Generation Computer Systems 26, May 20, 2010, pp. 1063-1072.

Basu et al, "Efficient virtual memory for big memory servers," ACM SIGARCH Computer Architecture News—ICSA '13, vol. 41 Issue 3, Jun. 2013, pp. 237-248.

J. Gandhi et al., "Range Translations for Fast Virtual Memory," in IEEE Micro, vol. 36, No. 3, pp. 118-126, May-Jun. 2016. doi: 10.1109/MM.2016.10.

Karakostas et al., "Redundant Memory Mappings for Fast Access to Large Memories," ISCA'15, Jun. 13-17, 2015.

R. W. Pfile, D. A. Wood and S. K. Reinhardt, "Decoupled Hardware Support for Distributed Shared Memory," Computer Architecture, 1996 23rd Annual International Symposium on, May 24, 1996, pp. 34-34. doi: 10.1109/ISCA.1996.10010.

Petter Svard, Benoit Hudzia, Johan Tordsson, and Erik Elmroth. 2011. Evaluation of delta compression techniques for efficient live migration of large virtual machines. In Proceedings of the 7th ACM SIGPLAN/SIGOPS international conference on Virtual execution environments (VEE '11). Jul. 2011, ACM, New York, NY, USA, 111-120. DOI=http://dx.doi.org/10.1145/1952682.1952698.

* cited by examiner

RANGE-BASED MEMORY SYSTEM

CROSS-REFERENCE TO RELATED APPLICATIONS

This application is a continuation-in-part of U.S. patent application Ser. No. 15/650,056 entitled "MEMORY ADDRESS TRANSLATION", filed Jul. 14, 2017, which is hereby incorporated by reference herein in its entirety.

This application is related to the following co-pending Patent Applications: U.S. patent application Ser. No. 15/649,930 entitled "METHOD AND APPARATUS FOR TWO-LAYER COPY-ON-WRITE", filed Jul. 14, 2017, U.S. patent application Ser. No. 15/649,976 entitled "METHOD AND APPARATUS FOR FAST CONTEXT CLONING IN A DATA PROCESSING SYSTEM", filed Jul. 14, 2017, U.S. patent application Ser. No. 15/650,008 entitled "MEMORY NODE CONTROLLER", filed Jul. 14, 2017, U.S. patent application Ser. No. 15/819,328 "MEMORY SYSTEM FOR A DATA PROCESSING NETWORK", filed on the same date as this application, and U.S. patent application Ser. No. 15/819,574 entitled "FAST ADDRESS TRANSLATION FOR VIRTUAL MACHINES", filed on the same date as this application, which are hereby incorporated by reference herein in their entirety.

STATEMENT REGARDING FEDERALLY SPONSORED RESEARCH OR DEVELOPMENT

This invention was made with Government support under the Fast Forward 2 contract awarded by the U.S. DOE. The Government has certain rights in this invention.

BACKGROUND

This disclosure relates to coherence management in a data processing system that utilizes range-based memory address system. Data processing systems, such as a System-on-a-Chip (SoC) may contain multiple processor cores, multiple data caches, and shared data resources. In a shared memory system for example, each of the processor cores may read and write to a single shared address space. Cache coherency is an issue in any system that contains one or more caches and more than one device sharing data in a single cached area. There are two potential problems with a system that contains caches. Firstly, memory may be updated (by another device) after a cached device has taken a copy. At this point, the data within the cache is out-of-date or invalid and no longer contains the most up-to-date data. Secondly, systems that contain write-back caches must deal with the case where the device writes to the local cached copy at which point the memory no longer contains the most up-to-date data. A second device reading memory will see out-of-date (stale) data.

On a current page-based memory system, when data from a virtual address range is page into a physical address range previously occupied by data belonging to another virtual address range, the new data is broadcast through the coherence network on a cache line granularity (number of cache lines per page is equal to the page granularity (e.g., 4-kilobytes)) so that every core on that coherence network is not flushed of the old data values for the physical address range in question.

When an out-of-coherence network device wishes to gain a specific coherence states over a range of address, the coherence state of any data stored in caches must be modified. For a standard page-based memory system, this problem is handled by issuing cache maintenance instructions for some or all elements within the target address range (typically at page granularity, e.g., 64 separate requests for a 4-kilobyte page). A broadcast is necessary for each of those separate requests regardless of if the data is extant in the caches or not.

DETAILED DESCRIPTION OF THE EMBODIMENTS

Figure 1:
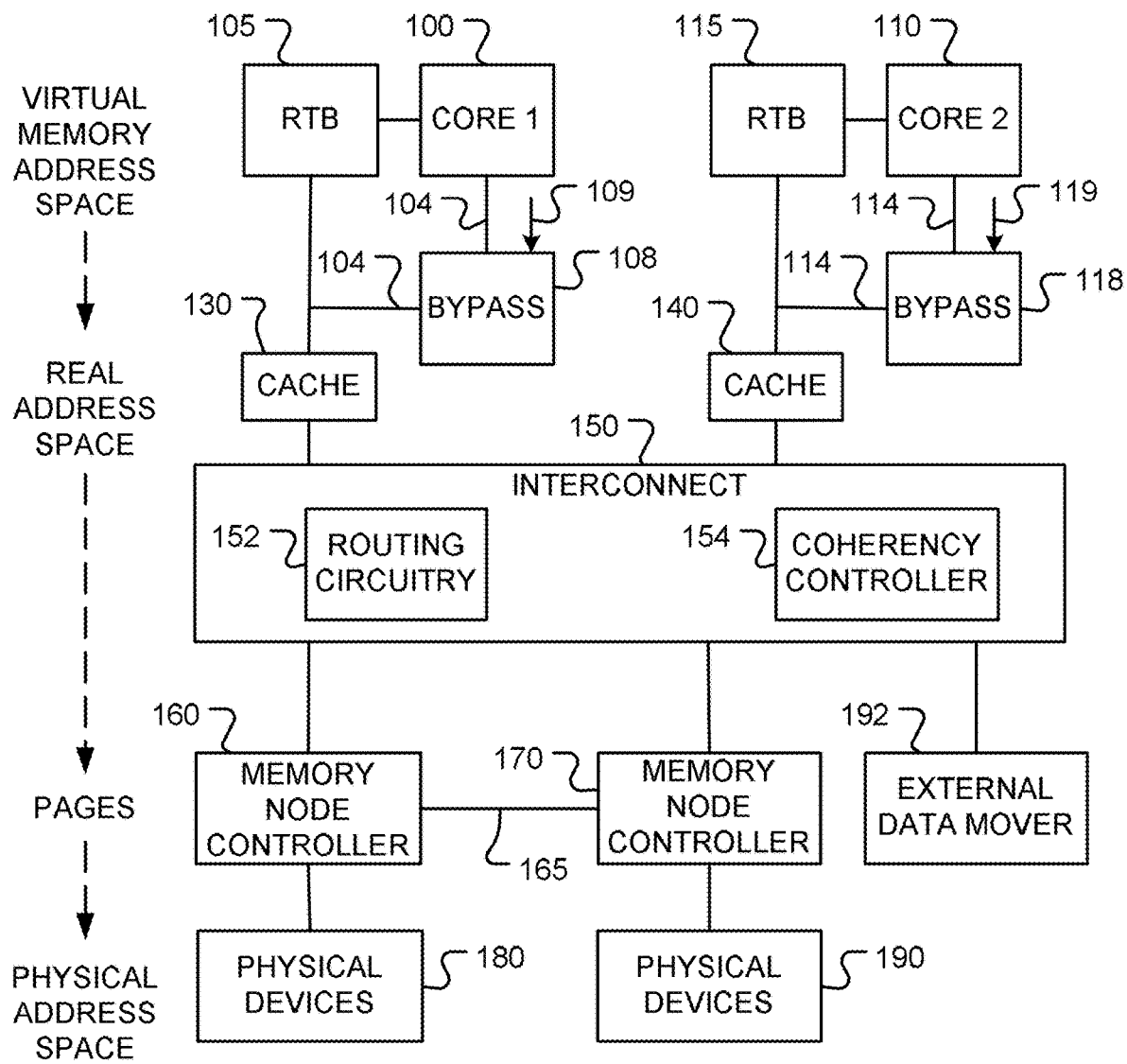
FIG. 1 schematically illustrates a data processing apparatus.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All documents mentioned herein are hereby incorporated by reference in their entirety. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus and device may be used interchangeably in this text.

The various embodiments and examples of the present disclosure as presented herein are understood to be illustrative of the present disclosure and not restrictive thereof and are non-limiting with respect to the scope of the present disclosure.

Further particular and preferred aspects of the present disclosure are set out in the accompanying independent and dependent claims. Features of the dependent claims may be combined with features of the independent claims as appropriate, and in combinations other than those explicitly set out in the claims.

In a conventional page-based memory system, when data from a virtual address range is page into a physical address range previously occupied by data belonging to another virtual address range, the new data is broadcast through the coherence network on a cache line granularity so that every core on that coherence network is not flushed of the old data values for the physical address range in question. The number of cache lines per page is equal to the page granularity (e.g., 4-kilobytes).

A range based, a two-level address translation mechanism is described in co-pending Patent Applications: U.S. patent application Ser. No. 15/650,056 entitled "MEMORY ADDRESS TRANSLATION", filed Jul. 14, 2017 and incorporated herein. With a range based mechanism, data is moved via drivers external to the cache coherent network. That is, pages may be moved from one physical device to another). This results in cached data that could have been assigned to one system address space and associated with data containing old values. For correct program execution, the cores must have the latest data values. In order to facilitate this exchange, the mechanism disclosure here enables an external device that moves data without passing through the coherence network to apply a coherence flush operation selectively to data within a specified range. Using this mechanism, only cache lines that are extant within the cache network receive flush requests, thereby reducing the burden on cache tag data structures.

In prior systems, when an out-of-coherence network device wishes to gain a specific coherence states over a range of address, the coherence state of any data stored in caches must be modified. For a standard page-based memory system, this problem is handled by issuing cache maintenance instructions for some or all elements within the target address range (typically at page granularity, e.g., 64 separate requests for a 4-kilobyte page). A broadcast is necessary for each of those separate requests regardless of if the data is extant in the caches or not.

In contrast, the mechanism disclosed here enables an out of coherence network device to signal a range of addresses to be modified with a specific coherence state. Subsequently, the range based coherence modification mechanism issues the state modification only for those lines that are extant in the cache and not already in the proper state. This approach greatly reduces the amount of bus traffic required for each range coherence modification.

Referring now to the drawings, FIG. 1 schematically illustrates a data processing apparatus.

A number of processor cores 100, 110 are provided. The data processing apparatus may be configured as a network in which the processing cores 100 and 110 are nodes. In the example of FIG. 1, two such processor cores are illustrated, but more processor cores could be provided. Alternatively, the system could comprise just one processor core.

The processor cores are arranged to process data in accordance with virtual memory addresses. For example, each of the processor cores may process data in accordance with virtual memory addresses in a respective virtual memory address space, for example under the control of an operating system or a so-called hypervisor which allocates virtual memory address spaces to the processes being performed by the different processor cores, partly as a technique for avoiding a process associated with one processor core accidently or maliciously accessing data appropriate to a process being executed by another of the processor cores.

A memory address translation apparatus is provided to translate between the virtual memory addresses in the virtual memory address space and so-called real addresses.

In the context of the memory address translation techniques to be discussed below, the real addresses are "output" memory addresses in an output address space (a so-called real address space). This could represent a physical address by which a physical memory device or other addressable unit could be physically addressed. Or, the real (output) memory addresses could represent addresses which need a further stage of address translation before being used to access a physical memory device or other addressable unit. From the point of view of the address translation techniques to be discussed, either of these options is equivalent. That is to say, the address translation techniques start with a virtual memory address and produce an output memory address. Whether or not the overall apparatus then performs another stage of address translation on the output memory address is immaterial to the generation of the output memory address itself.

In FIG. 1, address translation is carried out by a so-called range table buffer (RTB) 105, 115. This performs address translation between a virtual memory address in the virtual memory address space and an output memory address in the output (real) address space. Each of the processor cores has a respective range table buffer. The operation of the range table buffer will be described in detail below.

Bypass logic 108, 118 is provided to selectively bypass the RTB 105, 115 when the address translation is such that a virtual memory address is equal to a corresponding output memory address. The bypass circuitry or logic is controlled by a control signal 109, 119 which will be discussed below. When the bypass logic is enabled, either the RTB 105, 115 does not perform any translation, or the translation performed by the RTB 105, 115 is ignored and the virtual memory address is provided, by a bypass route 104, 114, for use as the output memory address.

The memory address translation operations to be discussed below will assume that the bypass logic is not currently enabled (unless otherwise stated).

The processor cores 100, 110 are implemented or fabricated on an integrated circuit substrate in this example, and may both (or all in the case of more than two) be provided on the same integrated circuit substrate. These devices are referred to in FIG. 1 as being "on-chip".

Also provided on-chip is a cache and/or system cache memory 130 to provide a temporary store for a subset of data held by the memory system to be discussed below, such as a most-recently accessed subset and/or a speculatively fetched subset. As shown in FIG. 1, the two processor cores 100, 110 share a common cache/system cache 130, but in other examples more than one could be provided, and another cache 140 is shown in broken line to illustrate such an arrangement.

The cache/system cache 130 (140) operates according to the output (real) memory addresses generated by the RTB 105, 115.

Off-chip, one or more memory node controllers 160, 170 are provided, which in turn access one or more respective physical devices 180, 190 such as dynamic random-access memories (DRAMs). Given that the physical devices 180, 190 operate in a physical address space, two functions of the memory node controllers 160, 170 can include: (a) translation of output (real) memory addresses to physical memory addresses, if a further stage of translation is needed, and (b) management of which of the physical devices 180, 190 needs to be accessed in order to implement a required memory access operation.

The translation operation (a) mentioned above can be carried out either using the techniques to be discussed below, or by a known memory address translation technique. The management operation (b), to manage which of the physical devices 180, 190 should be accessed, can be carried out using, for example, a table or directory stored at one or more of the memory node controllers 160, 170 to indicate a partitioning of the physical address space between physical devices and, in turn, memory node controllers.

It is not a requirement that more than one memory node controller 160, 170 is provided, but in the example of FIG. 1, two memory node controllers are provided. If one of the memory node controllers (such as a the memory node controller 160) receives a request for a memory access transaction which relates to an address handled by another memory node controller such as the memory node controller 170, the first memory node controller 160 can communicate via a data connection 165 with the other memory node controller 170, passing on the output (real) address relating to that transaction and requesting that the transaction be carried out by the second memory node controller 170.

The data processing apparatus of FIG. 1 may be implemented as a single integrated circuit, for example as a so-called system on a chip (SoC) or a so-called network on a chip (NoC). Alternatively, the data processing apparatus of FIG. 1 may be implemented as multiple discrete devices connected by interconnect circuitry 150. Routing circuitry 152 enable messages and data to be passed between the various elements of the data processing network. The data processing apparatus of FIG. 1 is just one example of how a set of processing elements may be interconnected. In other examples, processing elements are interconnected by a bus, network, memory, RDMA (remote direct memory access, allowing a processing element of one computer to access the memory of another processing element of another computer without the involvement of either device's operating system), or equivalent device. Therefore, interconnect circuitry 150 is simply an example indicative of various types of networking, interconnecting, bus or other circuitry to interconnect processing elements to allow the exchange of data and the switching of task execution in the manner described here.

In example embodiments, the interconnect circuitry may be an example of so-called cache coherent interconnect circuitry. Here, the term "coherent" refers to the maintenance of a correct relationship between multiple copies of the same data stored across the whole system. For example, data may be stored in a cache memory device 130 by one of the data handling nodes (such as the processing core 100). Other nodes (such as processing core 110) may be processing elements having their own respective cache 140 which, depending on the nature of the processing element operations, may store one or more copies of data which is also held in cache memory 130. In the case of a data handling access by one node to such information, there is a need to ensure that the accessing node is accessing the latest version of the stored information, and that if it makes any alteration to the stored information, either the other versions are correctly altered themselves or the other versions are deleted or invalidated. In general terms, caches 130 and 140 together with coherency controller 154 provide coherent memory circuitry storing one or more copies of data accessible by each of the processing elements (for example, each of the processing elements connected via the interconnect circuitry 150), so that data written to a memory address in the coherent memory circuitry by one processing element is consistent with data read from that memory address in the coherent memory circuitry by another of the processing elements.

Coherency controller 154 provides a point of coherency for the data processing apparatus and maintains a record of address tags, coherence state and location of cached data. In an alternative embodiment, each memory node controller may provide a point of coherency for a designated range of real addresses and for the physical devices that are accessed via the memory node controller. Coherency controller may be associated with a lowest level cache (LLC) or system cache.

In examples, the coherent memory circuitry comprises two or more coherent cache memories (130, 140) and the coherent memory circuitry is configured to store one or more (for example, multiple) copies of the data accessible by each of the processing elements. In the example situation discussed above of devices being added to or subtracted from the interconnected arrangement, the coherency controller 154 can be arranged to react to the addition of a device by adding it to the so-called coherency domain, and bringing it into coherent operation with other devices in the interconnected arrangement, and to react to the subtraction of a device by reconfiguring the coherent domain to operate in the absence of that device. This reconfiguring may involve first ensuring (before the device is removed) that any data updates at that device are appropriately propagated to other coherent devices and/or the higher-level memory.

The data routing circuitry 152 and/or the coherency controller 154 include various mechanisms and circuitry to provide for coherent operation. An example processing element in the arrangement of FIG. 1 may make reference to data stored in an associated cache memory, with both the processing element and the cache memory being in communication with the interconnect circuitry. The cache memory may store copies of information held in a higher-level memory. In some instances, the two copies can be the same, for example if a copy has been cached during a memory read operation. In other instances, circumstances could arise which would lead to copies differing from one another, for example if a data write operation has been carried out by a particular processing element (such as the processing element 100) with respect to the copy of a data item stored in the cache 130. In a system of multiple caches, there is a need to ensure that before one version of a data item is accessed, any changes which have been implemented in respect of other versions are fully implemented for all copies. The role of logic associated with the cache coherence function is therefore to ensure that before a data handling transaction takes place, if the version of the data item to be accessed is out of date (because of a modification made to another copy of the same data item), the copy to be accessed is first brought up to date. Similarly, if the data handling transaction involves modifying a data item, then cache coherence logic avoids conflicts with other existing copies of the data item. Techniques for achieving this include (for example) the use of a so-called "snoop filter".

The term "snoop filter" is a historical one and is used here to refer to a control device forming part of the coherency controller 154 having an associated "directory", where the directory stores information indicating which data is stored in which cache, and the snoop filter itself at least contributes to the handling of data accesses to cached information to provide a cache coherence function.

The coherency controller 154 including the snoop filter provides an example of a cache coherency controller configured to coordinate, amongst the cache memories, an access to a memory address by one of the cache memories when the directory indicates that another of the cache memories is caching that memory address. The snoop controller stores or provides a directory such as the directory mentioned above indicating, for memory addresses cached by one or more of a group of one or more cache memories connectable in a coherent cache structure, which of the cache memories are caching those memory addresses.

In accordance with the present disclosure, an external device, such as external data movement engine 192, utilizes coherency controller 154 to modify the coherence state of data stored in caches of the data processing apparatus. This is discussed in more detail below.

Figure 2A:
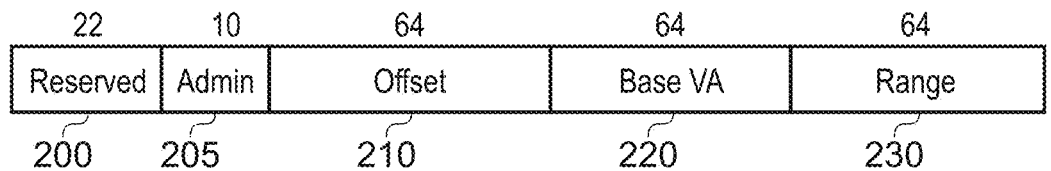
FIGS. 2a and 2b schematically illustrate respective instances of translation data.

The range table buffers (RTBs) 105, 115 operate by storing one or more instances of translation data. FIG. 2*a* schematically illustrates such an instance of translation data.

Referring to FIG. 2*a*, an instance (or indeed each instance) of translation data is formed as a 224-bit word comprising 22 reserved bits 200, 10 bits of administrative data discussed below) 205, 64 bits of address offset data 210, 64 bits of "base virtual address" data 220 and 64 bits of range data 230.

The data 220, 230 together define a range of virtual memory addresses between respective virtual memory address boundaries in the virtual memory address space. In the example of FIG. 2*a*, the range of virtual memory addresses is between the address represented by Base VA up to and including the address represented by Base VA+Range. Here, it will be appreciated that it is not necessarily the case that the lowest address in the range has to be defined by the field Base VA. More generally, a range of virtual addresses can be defined by one reference value at a predetermined position relative to the range of virtual addresses, so that in other examples the field 220 could be occupied by (for example) "highest VA" such that the range of virtual memory addresses is defined by "highest VA-Range" up to "highest VA". In other examples, the field 220 could be occupied by (for example) "central VA" such that the range of virtual memory addresses extends between "central VA-Range" up to "central VA+Range". Again, "central VA" would be an example of a virtual memory address at a predetermined position relative to the range of virtual memory addresses. However, the present examples will assume that the field 220 is occupied by the Base VA and that the respective virtual memory address boundaries of the range of virtual memory addresses are in this example Base VA and Base VA+Range.

The offset field 210 contains an address offset between a virtual memory address in the range of virtual memory addresses and a corresponding output memory address in an output address space, which is applied as a linear sum to a virtual memory address in the range defined by the boundaries discussed above to generate the respective output memory address. The offset can be positive, negative or indeed zero. So, for an arbitrary virtual memory address VA_test which falls within the range defined by base VA and base VA+Range, the translated (output) memory address in the output memory address space can be expressed as:

$$\text{VA\_test}+\text{offset.}$$

In this example, the offset represents a simple difference between any virtual memory address in the virtual memory address range and a corresponding output memory address.

Figure 2B:
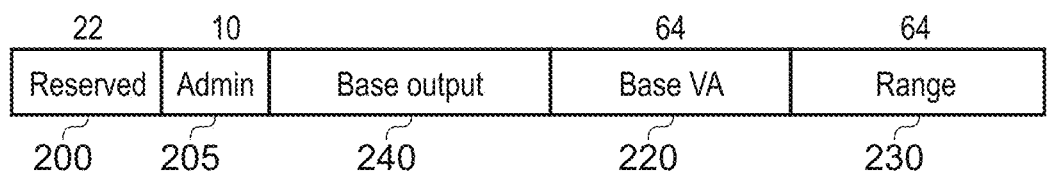

Another example is shown schematically in FIG. 2b, in which the fields 200, 205, 220, 230 can be identical to those shown in FIG. 2a, but in place of the offset fields 210, a field referred to as base output 240 is provided which indicates the output memory address corresponding to (in this example) the address base VA in the virtual memory address space. More generally, the field 240 can indicate a reference memory address in the output address space corresponding to a virtual memory address at a predetermined position (such as the predetermined positions in the examples discussed above) relative to the range of virtual memory addresses so that the translation circuitry to be discussed below is configured to translate a given virtual memory address in the range of virtual memory addresses by adding to or subtracting from the reference address in the output address space and are now dependent upon a difference, in the virtual memory address space, between the given virtual memory address and the virtual memory address at a predetermined position relative to the range of virtual memory addresses. This gives a translation function as:

(VA_test-predetermined VA)+reference.

The type of translations defined by the translation data of FIG. 2b provide a potentially variable size of range covered by a single instance of translation data, and can provide multiple translations mapping different virtual memory addresses to the same output memory address, if that is required.

Figure 3:
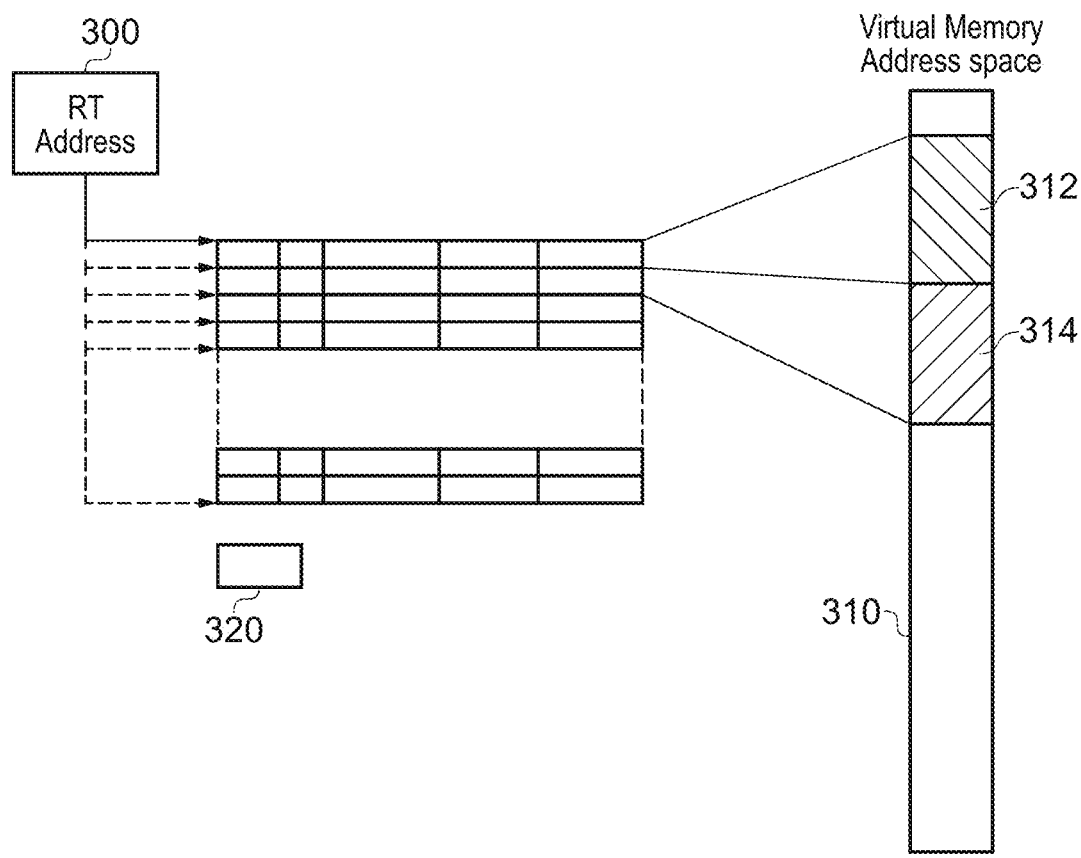
FIG. 3 schematically illustrates the storage of multiple instances of translation data.

FIG. 3 schematically illustrates the storage of multiple instances of the translation data of FIG. 2a or 2b, for example in the cache 130 (140) or in the memory system off-chip, for example in one of the physical devices 180, 190.

A storage location which defines the storage of a set of instances of translation data is provided by a variable RT address 300. The derivation of the variable RT address will be discussed further below. The memory address represented by RT address can be, for example, a real (output) address, a physical memory address or another memory address. In the present example, the variable RT address represents a physical memory address of the set of instances of translation data in physical memory.

As indicated schematically by the broken arrows of FIG. 3, the variable RT address can provide location information for each of the (or more than one of the) instances. Or the locations can be inferred from the size of each instance (for example 224 bits) and the location of a reference one of the instances.

The instances of translation data can be pre-stored in the memory by, for example, the operating system and/or hypervisor and can be ordered, for example, in order of their applicability to the virtual memory address space. By way of example, the virtual memory address space is illustrated as a rectangle 310 to the right-hand side of FIG. 3 and the ranges of virtual memory addresses represented by an upper two (as drawn) instances of translation data are shown schematically as ranges 312, 314 in FIG. 3. Further data 320 can be stored, either by the RTB (in the store 460 discussed below) or alongside the instances of translation data in the memory, indicating attributes such as a most frequently and/or most recently used instance of translation data, and/or the frequency of use of each instance of translation data, and/or how recently each instance of translation data has been accessed, or the like.

Figure 4:
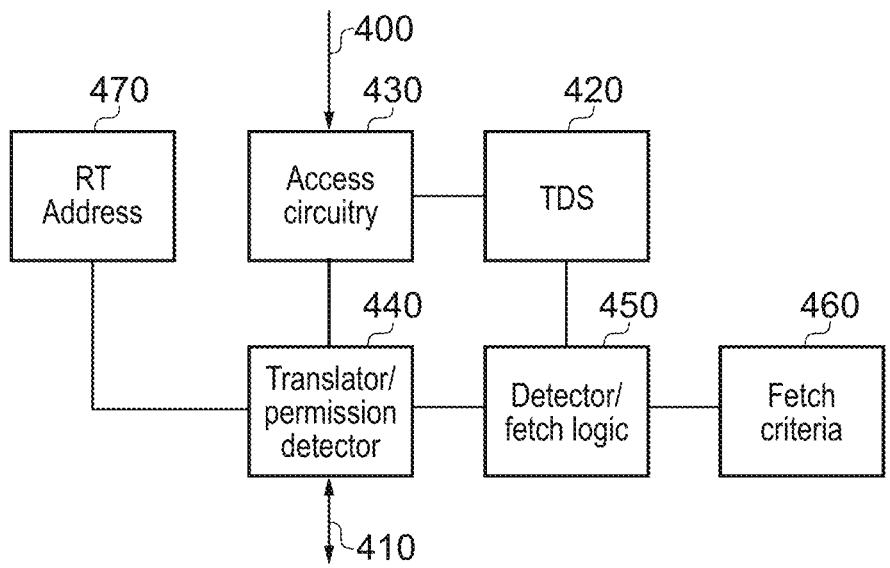
FIG. 4 schematically illustrates memory address translation apparatus.

FIG. 4 schematically illustrates memory address translation apparatus such as the RTB 105, 115 of FIG. 1, as an example of translation circuitry which can apply a translation defined by a detected instance of the translation data to a given virtual memory address.

The apparatus comprises an input 400 to receive a virtual memory address, an output 410 to output an output (translated) memory address, a translation data store 420 to store one or more instances of translation data as discussed above, access circuitry 430, a translator/permission detector 440, a detector/fetch logic 450, a store 460 to store fetch criteria, and a store 470 to store the RT address variable.

In operation, as discussed above, the translation data store 420 stores one or more instances of translation data such as the translation data shown in FIGS. 2a and 2b providing address range boundary values (such as base VA and range) defining a range of virtual memory addresses between respective virtual memory address boundaries in the virtual memory address space, and indicating a translation (such as the offset or base output fields) between a virtual memory address in the range of virtual memory addresses and a corresponding output memory address in the output memory address space.

In response to a virtual address received on the input 400, the access circuitry 430 accesses translation data held in the translation data store 420. For example, a single instance of translation data may be held at any one time in the translation data store 420. The detector/fetch logic 450 acts as detector circuitry to detect whether the virtual memory address to be translated lies within the range of virtual memory addresses defined by an (or the) instance of the translation data in the translation data store 420. If so, then the detector/fetch logic provides the data indicating the translation (such as the offset or base output fields to the translator/permission detector 440) along with the administrative data in the field 205. The translator/permission detector circuitry 440 applies the translation defined by a (or the) detected instance of the translation data to the input (given) virtual memory address to determine the translated (output) memory address. This is provided on the output 410 to the cache/system cache 130 and, if necessary, to one or more of the memory node controllers 160, 170.

If the detector/fetch logic 450 detects that the virtual memory address to be translated does not lie in the range of virtual memory addresses defined by an (or the) instance of the translation data in the translation data store 420, then the detector/fetch logic initiates the fetching of another instance (or one or more further instances) of translation data. To do this, the detector/fetch logic 450 can use fetch criteria stored in the fetch criteria store 460.

Examples of fetch criteria have been discussed above, and may include, for example, the most recently used instance of translation data (which is not an instance currently held by the translation data store), the instance of translation data which is most frequently used and which is not currently held in the translation data store, or the like. The detector/fetch logic 450 initiates the fetching of the translation data using the RT address variable stored in the store 470. The fetched instance of translation data is then stored in the translation data store, evicting the currently stored instance (if just one is held) or a least recently and/or least frequently used instance (of those held in the translation data store 420) if more than one instance is held there. Therefore, the detector/fetch logic 450 is configured, when the given virtual memory address to be translated lies outside the ranges of virtual memory addresses defined by any instances of the translation data stored by the translation data store, to retrieve one (or indeed more) further instances of the translation data. To do this, the detector/fetch logic 450 may access one or more memory locations (for example defined or referenced by the variable RT address) storing further instances of the translation data. In this way, the variable RT address may act as a location parameter and the detector/fetch logic 450 is configured to retrieve one or more further instances of the translation data from memory locations defined by one or more such location parameters indicating addresses in the output memory space (or indeed in the physical memory space if that is different).

As discussed above, the fetch criteria 460 may be such that the detector/fetch logic 450 is configured to retrieve the one or more further instances of the translation data in an order of usage of the instances of translation data. For example, the order of usage may be an order of most frequent usage, although it could be an order of most recent usage.

Another function of the translator/permission detector 440 is to detect the administrative data 205 of the instance of translation data used in respect of the current translation, and which indicates access permissions associated with the range of virtual memory addresses of that instance of translation data. This permission data can either by passed on to the cache/system cache 130 as permission data associated with the current memory access, or can be used to control or gate current attempted memory accesses such that if they breach the permission data they are not forwarded to the cache/system cache 130 by the translator/permission detector.

Therefore, the arrangement of FIG. 1 can provide one or more processors to process data in accordance with virtual memory addresses, and address translation apparatus such as that shown in FIG. 4 to translate a virtual memory address relating to a processing operation of the one or more processors into an output memory address to access a memory system responsive to the output memory address. The cache/system cache 130 may provide an example of a cache memory disposed between the address translation apparatus and the memory system, the cache memory being addressable in the output memory address space.

The memory node controllers 160, 170 and physical devices 180, 190 can provide a memory system responsive to memory addresses in the output memory address space.

If two or more processor cores 100, 110 are used, each processor can have a respective address translation apparatus 105, 115 to translate a virtual memory address relating to a processing operation of that processor 100, 110 into an output memory address to access the memory system 160, 170, 180, 190. As mentioned above, each processor 100, 110 may operate to process data in accordance with virtual memory addresses in a respective virtual memory address space. However, the real (output) memory address space can be common as between the processors 100, 110, such that the memory system 160, 170, 180, 190 is configured to operate according to the output memory address space common to interact with the address translation apparatus 105, 115 of each of the processors.

Figure 5:
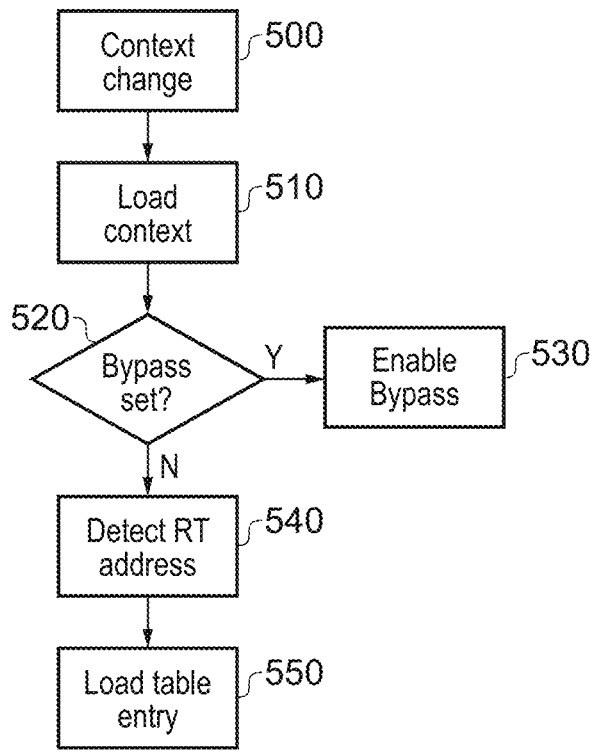
FIG. 5 is a schematic flowchart illustrating an initialization process.

FIG. 5 is a schematic example of an initialization process. The variable RT address can simply be established for the whole of run time at start up or boot of the system. Similarly, the controllers 109, 119 to indicate to the apparatus whether the bypass function should be enabled can also be established for the whole of run time at boot or start up. However, in other examples, these items are established at a so-called context switch.

By way of background, in arrangements of one or more interconnected processors, a program task such as a thread can be executed by the one or more processors in successive portions, possibly interspersed with portions of execution of other program tasks. Execution can be passed from one processor to another in a multi-processor or multi-core system. To enable this, a process referred to as context switching may take place.

In a context switch, each processor is configured to save context data relating to or applicable to a program task following execution of that program task by that processing element, and to load context data, previously saved by that processor element or another of the processors, at resumption of execution of a program task.

The context data can indicate a current processing state of the processor at the time that execution of the particular program task was paused or handed over. However, it can also provide some parameters established, for example, by the operating system and/or hypervisor which are common to each occasion on which that program task is executed. In the present example, the context data can indicate whether the bypass function should be enabled and the location within the memory of the instances of translation data applicable to execution of that program task. So, on loading the context data, the bypass function is enabled or disabled and, assuming the bypass function is disabled, the location within memory of the appropriate address translation data to be used by the RTB 105, 115 is identified. FIG. 5 schematically illustrates this initialization process as a schematic flowchart starting with, at a step 500, a change of context corresponding to a task swap as discussed above. This leads to the relevant processor loading a new context at a step 510.

With reference to the parameters defined by the newly loaded context, the processor core detects whether the bypass operation should be used for this portion of execution of the program task at a step 520. If the answer is yes then the bypass logic 108, 118 is enabled by the control signal 109, 119 at a step 530. If the answer is no, then control passes to a step 540 at which the variable RT address is detected (for example, from the context data applicable to the current task) and is stored in the store 470 of FIG. 4. Using the variable RT address, at least one table entry (for example, an instance of translation data) is retrieved and stored in the translation data store 420 at a step 550

Figure 6:
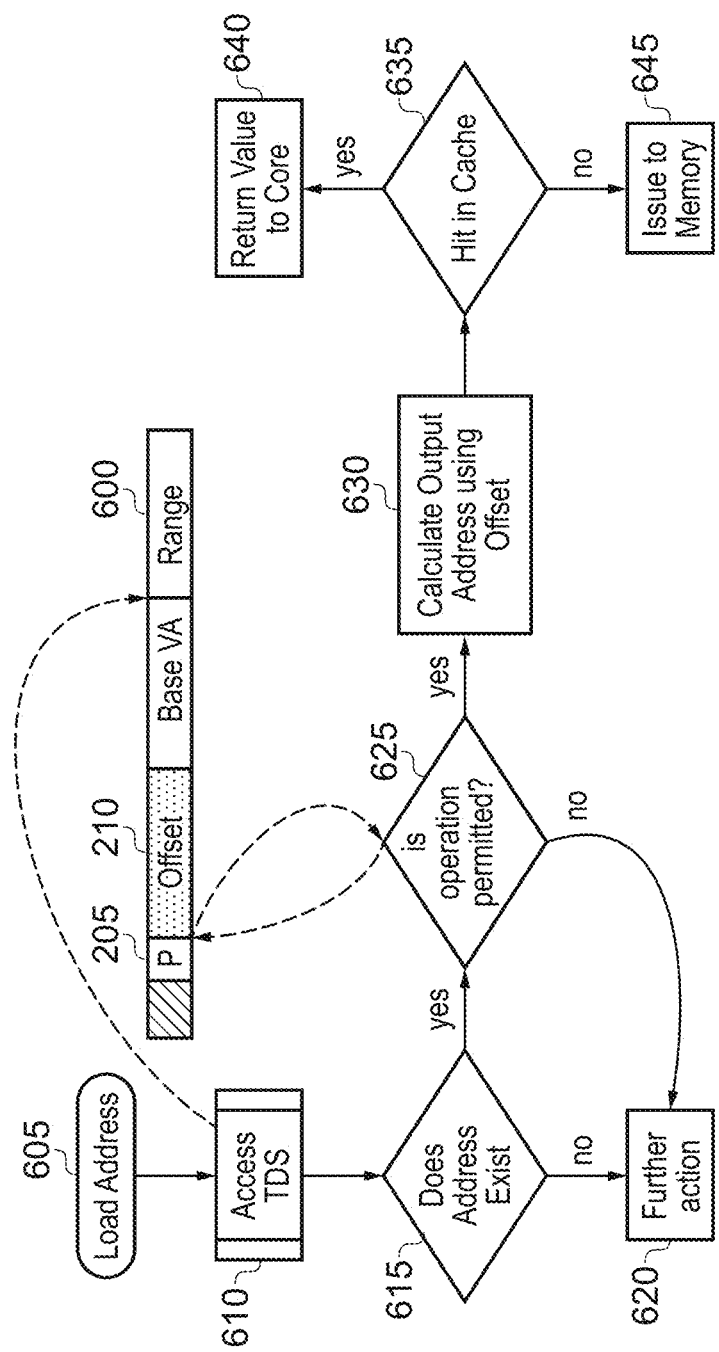
FIGS. 6 and 7 are schematic flowcharts illustrating methods of memory access.
Figure 7:
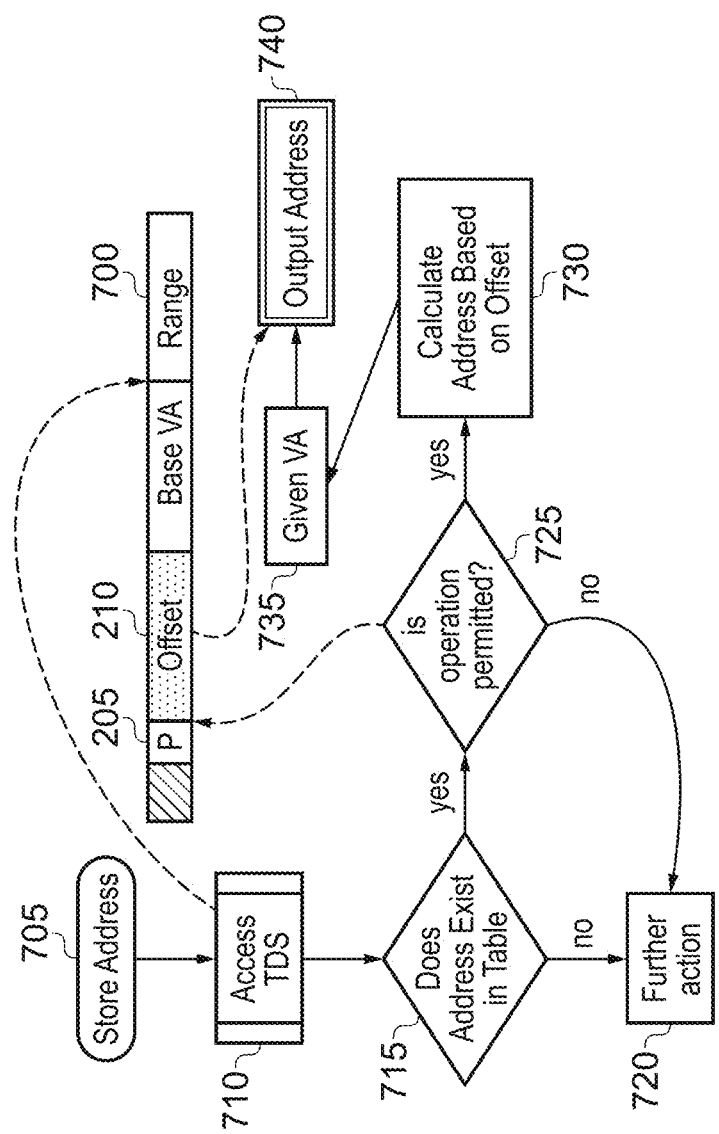

FIGS. 6 and 7 are schematic flowcharts illustrating methods of memory access. In particular, FIG. 6 schematically represents a load operation and FIG. 7 schematically represents a stall operation. In each case, reference is made to an instance 600, 700 of translation data held by the translation data store 420.

Referring first to FIG. 6, a load address 605 is generated by one of the processor cores 100, 110 indicating the virtual address from which one or more data items should be loaded. At a step 610, the access circuitry 430 looks up the one or more instances of translation data held by the translation data store 420. A detection is then made by the detector/fetch logic 450 at a step 615 as to whether the given virtual address (representing the load address) exists within the range or ranges defined by the translation data held in the translation data store 420. If the answer is no, then further action 620 to be discussed below is carried out. If, however, the answer is yes then control passes to a step 625 at which the translator/permission detector 440 accesses the administrative data field 205 within the translation data to detect whether the current operation is permitted according to the permission data associated with the range of virtual addresses defined by that instance of translation data. If the answer is no, then control passes to the step 620 at which further action (in this case the raising of a fault condition) is carried out. If, however, the answer is yes then the translator/permission detector 440 calculates the output address at a step 630 using the offset field 210 of the instance of translation data held in the translation data store 420.

The output memory address is passed to the cache/system cache 130 and at a step 635 a detection is made as to whether data corresponding to that output address is currently held in the cache/system cache 130. If the answer is yes then at a step 640 the required data item is returned to the processor core which initiated the transaction. If the answer is no then at a step 645 the memory access is referred to the memory system 160, 170, 180, 190 for processing.

A similar arrangement is shown schematically in FIG. 7 which illustrates a data storage operation.

Here, as mentioned above, reference is made to an instance 700 of translation data currently held by the translation data store 420.

At a step 705, the virtual address representing a required storage address is established by the relevant processor core.

At a step 710, the access circuitry 430 accesses the translation data store to detect whether the store address established at the step 705 lies within the range defined by the one or more stored instances of translation data. If, at a step 715, the store address does not lie within the range or ranges, then control passes to a step 720 at which further action to be discussed below is taken.

If, however, the answer is yes, then control passes to a step 725 at which the translator/permission detector 440 detects from the administrative data field 205 whether the current operation is permitted. If the answer is no, control passes to the step 720 at which further action (a fault condition in this example) is carried out. If, however, the answer is yes at the step 725 then control passes to a step 730 which calculates the output address for storage of the current data based upon the given virtual address representing the store address (735) and the offset field 210 to generate the output address 740 for use in the storage operation.

Figure 8:
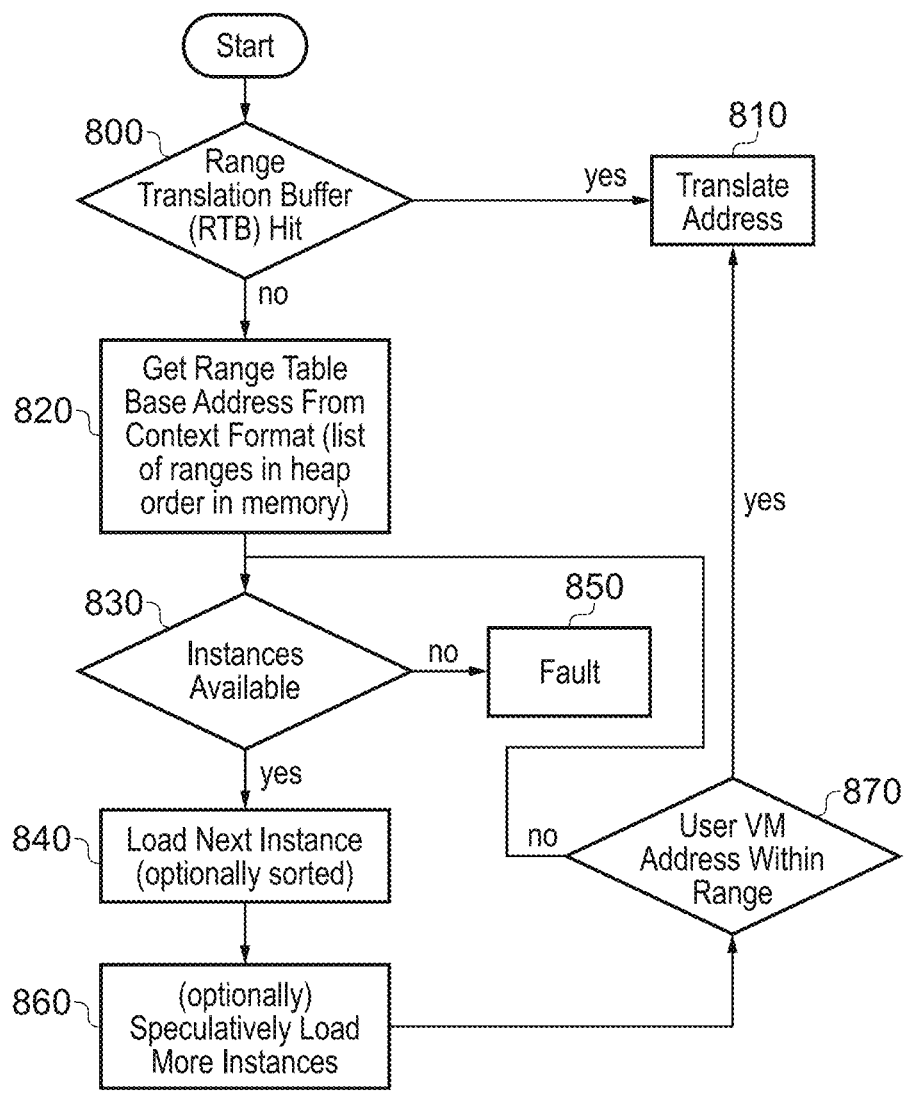
FIG. 8 is a schematic flowchart illustrating a memory address translation method.

FIG. 8 is a schematic flowchart illustrating a memory address translation method, and in particular addresses the negative outcome of the steps 615, 715 of FIGS. 6 and 7, when it is detected that a currently required virtual address does not lie within the range or ranges defined by the one or more instances of translation data held by the translation data store.

Referring to FIG. 8, at a step 800, if there is a "hit", which is to say the current virtual memory address to be translated does lie within one of the ranges defined by the one or more instances of translation data held by the translation data store 420, then control passes to a step 810 which summarizes the translation process discussed above, and the current (given) virtual address is translated into a corresponding output memory address.

However, if the outcome is no from the step 800, corresponding to the negative outcome of the steps 615, 715, then control passes to a step 820 at which the RT address (RT base address) which forms part of the context format and may optionally be buffered or stored by the RTB 105, 115 in the store 470, is accessed.

At a step 830, if the RTB 105, 115 detects that instances of translation data are indeed available to be accessed (they are not all currently held by the translation data store 420) then control passes to a step 840. If there are no more instances available to be retrieved then control passes to a step 850 at which a fault condition is established.

At the step 840, a next instance is retrieved by the detector/fetch logic 450. These may optionally be accessed in a sorted order (they may be sorted in order of usage, for example by frequency of usage) so that a next most used instance is accessed. Optionally, at a step 860, one or more other instances can be speculatively loaded as well.

The test of the step 800 is effectively repeated at a step 870. If the given virtual address for translation is within the range or ranges defined by the newly loaded instance then control can pass to the step 810 for the translation to be performed. If not, control returns to the step 830 so that one or more other instances (if available) are loaded again with the step 840, or a fault condition is established at the step 850 if no more instances are available.

Figure 9:
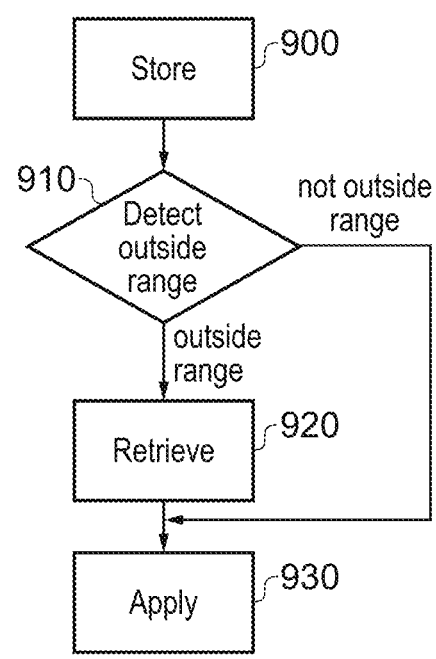
FIG. 9 is a schematic flowchart illustrating a memory address translation method.

FIG. 9 is a schematic flowchart illustrating a memory address translation method comprising: (i) storing (at a step 900) one or more instances of translation data providing address range boundary values defining a range of virtual memory addresses between respective virtual memory address boundaries in a virtual memory address space, and indicating a translation between a virtual memory address in the range of virtual memory addresses and a corresponding output memory address in an output address space; (ii) detecting (at a step 910) whether a given virtual memory address to be translated lies in the range of virtual memory addresses defined by an instance of the translation data in the translation data store; (iii) when the given virtual memory address to be translated lies outside the ranges of virtual memory addresses defined by any instances of the translation data stored by the translation data store, retrieving (at a step 920) one or more further instances of the translation data; and (iv) applying (at a step 930) the translation defined by a detected instance of the translation data to the given virtual memory address.

Caches L2 through to the lowest level cache (LLC) may be physically indexed, physically tagged (PIPT) caches. In a PIPT cache, actions such as a change of physical address or the loading of a physical address in memory have direct consequences for the on-chip coherence network. Data placement technologies, such as optimal data placement from one physical (non-cache) media to the next for bandwidth/latency, require modifications to the coherence state of copies of data in caches (e.g., from valid to invalid state so that on next load of the data that has moved physical addresses, the new physical address will be loaded by the translation machinery).

Data movement may result from external direct memory access (DMA), data rearrangement, data movement for accelerators, processing near memory, or remote direct memory access (RDMA), movement of data between lower bandwidth memory (LBM) and high bandwidth memory (HBM), or other operations. Such data movement may require modification of the coherence state of cached data. Without involving the core, if data is moved from one physical set of addresses (in LBM for example) to a new set of physical addresses (within the HBM, for example), several issues arise with respect to cache coherence.

Firstly, if the data in LBM was referenced by any core within the coherence network as cacheable, then it could exist in a shared or modified state within the cache. It must be flushed before moving to HBM otherwise the HBM will receive a stale copy. Even worse, the modifications will not be accessible to the HBM given the lack of physical address aliasing and the potential for write-after-write errors if those invalidations are synchronized out of order with pending modifications to the new stale HBM copy.

Secondly, if the physical addresses occupied by the HBM were previously used by other data (which is likely given the scarcity of HBM space on-chip), then the cache will also likely carry copies of those physical addresses in a shared or modified state that are still perfectly valid. The first time the core tries to access the data, the core will receive the cached copy versus the expected version recently moved to the HBM via the data movement engine.

For standard systems, this problem may be handled on page interrupt and page move through the main core. The coherence network is flushed as the core loads the new page from block device or NIC to DRAM cache line by cache line through the coherence network (which indirectly updates the cache). With an external data movement engine, there are a number of potential approaches.

A first approach to this problem is to simply flush the caches on the external data mover operation for all data that could have been previously cached. This is not practical for a high-performance computer (or any modern core) as it effectively denies the core the use of the tag array memory (associated with each cache level). Tag array access is important to the latency and timing of modern cache structures.

A second approach, which is used for IO device memory, uses a memory management unit (MMU) to mark pages that are intended for operation with a data movement engine as non-cacheable. This approach is disadvantageous for high-performance computer systems in which it is desirable to store data in close physical proximity to the compute elements.

A third approach is to provide the same physical address for multiple real physical locations. This involves either augmenting the physical address with a prefix to identify which physical device to target with the request or provide a physical address range look-up routing table to provide the effect of a prefix without having to provide the prefix. This approach is more practical than the first and second approaches, however if a table is to be used provide the routing, then the address ranges used must be limited so that space needed for the routing table does not become prohibitively large.

A fourth approach is to ensure that the latest values (all modified lines) were extant in memory before an operation proceeds. In this approach, a data processing network is configured such that a single request from an out-of-coherence network device enables the device to gain a specific coherence state over a range of addresses. This technique is useful, for example, for transparent migration of data without directories. It is also useful for computation in or near memory (including in-memory controller rearrangement techniques) so that the near memory devices can gain coherence control over a range of addresses. A reverse look-up procedure is used that enables an external data movement engine or other external device to efficiently change the coherence state of lines inside the caches of target processing clusters.

Figure 10:
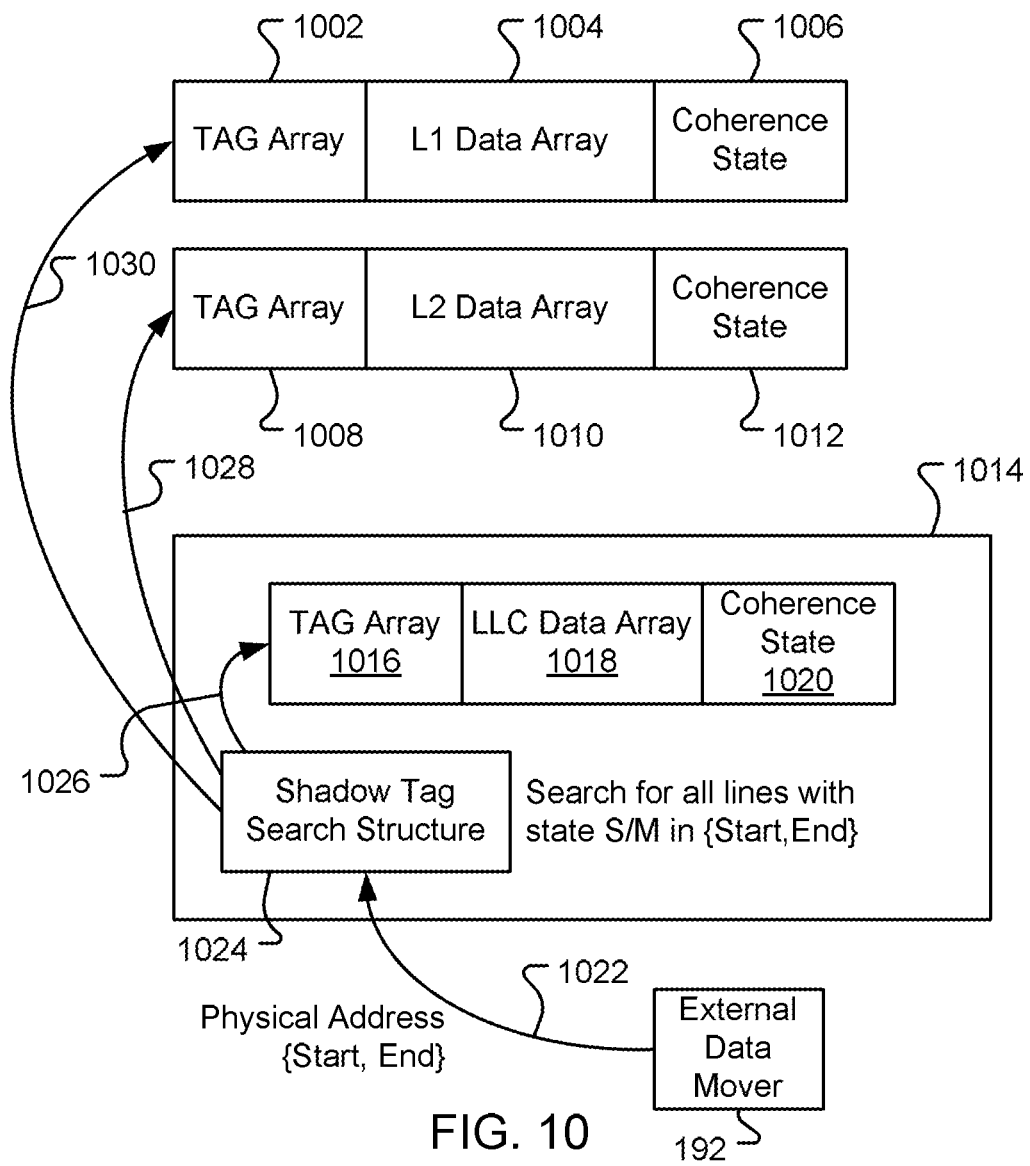
FIG. 10 is a high-level block diagram of an apparatus for coherence modification in a data processing network, in accordance with embodiments of the disclosure.

FIG. 10 is a high level block diagram of an apparatus for coherence modification in a data processing network, in accordance with embodiments of the disclosure. In the simplified example shown, the data processing network includes an L1 cache with tag array 1002, data array 1004 and coherence state bits 1006, an L2 cache with tag array 1008, data array 1010 and coherence state bits 1012, and an L3 cache 1014 with tag array 1016, data array 1018 and coherence state bits 1020. In this example, L3 cache 1014 is the lowest level cache (LLC). For example, the coherence state bits may indicate when the associated data is in a Modified (M), Owned (O), Exclusive (E), Shared (S) or Invalid (I) state.

External data mover 192 or other device, may operate on a range of data. When the coherency controller does not maintain a record of the data, the device is termed an 'out-of-coherence' device. However, copies of data in the range may exist in caches. The coherence state of any cached data must be altered when data in the range is operated on. For example, it may be desired to mark the data as being invalid. To achieve this, message 1022, containing a range address packet, is sent from external data mover 192 or another out-of-coherence device to filter 1024 associated with coherency controller 1014. The filter 1024 comprises a Tag Search Structure that is used to break the range address packet into cache line messages 1026, 1028 and 1030 that are targeted only to lines that exist in the cache with the target states. For example, if the coherence state is changed to invalid, lines already in the invalid state are ignored and messages are sent only to the lines in the shared (S) or modified (M) states. The search may utilize a search tree structure such as a binary search tree, a B-tree an A-B tree, a ternary tree, a quad-tree or an oct-tree, for example. Other search structures may be used without departing from the present disclosure.

More generally, the filter uses a directory, search-tree, or other structure, indexed or searched using an address tag. The filter indicates the coherence state and location of cached data. If an address tag with the designated range is not present in the directory, or if it is already in the requested coherence state, there is no need to send a message to any cache. If the address tag with the designated range is present in the directory and not already in the requested coherence state, a message may be sent to caches indicated as having a copy of the data. These caches may be indicated by a presence vector, for example.

In a range-based memory system, cached data is identified using system address tags. However, the mechanism disclosed here may also be implemented in a convention page-based memory system in which a page table memory is configured to stored mappings between virtual address pages in the virtual address space and physical address pages in the shared storage resource. In this implementation cached data is identified using physical addresses tags. In a paged based memory system, translation lookaside buffers (TLBs) store recent mappings between virtual address pages and physical address page in a shared storage resource. The TLBs provide rapid address translation. The page table memory is only searched when the address in the mapping between the virtual address page and the physical address page is not found in the translation lookaside buffer.

Using a tag search structure is much more efficient than a simple approach in which messages are issued to invalidate every line within the range. The simple approach would have the intended result; however, it would lead to an effective 'denial of service' attack on the L2/L1 tag arrays, which would be inundated with messages. The approach illustrated in FIG. 10 is far more efficient, modifying only the lines needed and issuing requests for only the lines that need to be targeted.

The information stored in the tag search structure is similar to that stored in a snoop filter. In some embodiments, the same hardware structures may be used for both purposes. A snoop filter is designed to determine locations of a particular memory address. However, the tag search structure is configured to a range of addresses. The search may include searching for the first and last addresses in the range.

As an example, for sizing, a 2 MB, L2, 4-way set associative cache is considered. The structure must index into a maximum of 32K unique tags, each of 18-bits each, resulting in a binary search tree structure of 60 KB for the 2 MB array. An un-optimized implementation of this structure would take 15 cycles to find the tags within the L2 and L1 cache that could match the given range (well under the time it would take to refill the valid data to the cache if a full cache flush were to be used). The same approach would apply to each distributed and banked L3 home node which would likely serve as the first level of filtering for the L2/L1. Motivation for this approach is that it does not incur the overhead of the full flush, nor the un-cacheable solutions. It could likely be implemented with less overhead and none of the complexity of a prefix routing table which aliases physical addresses to multiple physical devices.

The approach shown in FIG. 10 may be used for external DMA, data rearrangement, processing near memory, RDMA, and many other applications. An external device with access to the proper channels (for example, the coherent mesh network), is able to initiate a request to change the coherence state of multiple lines through issuance of a range command with the intended coherence state (such as shared, exclusive, etc.). This can be done for a rather large L2 cache in 15 cycles while being off the critical path. Subsequent invalidations or modifications may be routed from the last level cache towards the inner caches, with only extant lines being targeted at lower level caches (and even the LLC). The result is that the TAG array look-ups are minimized compared to invalidating an entire page or range at a time and only the lines that need to be modified or are extant in the lower level caches, are touched.

Figure 11:
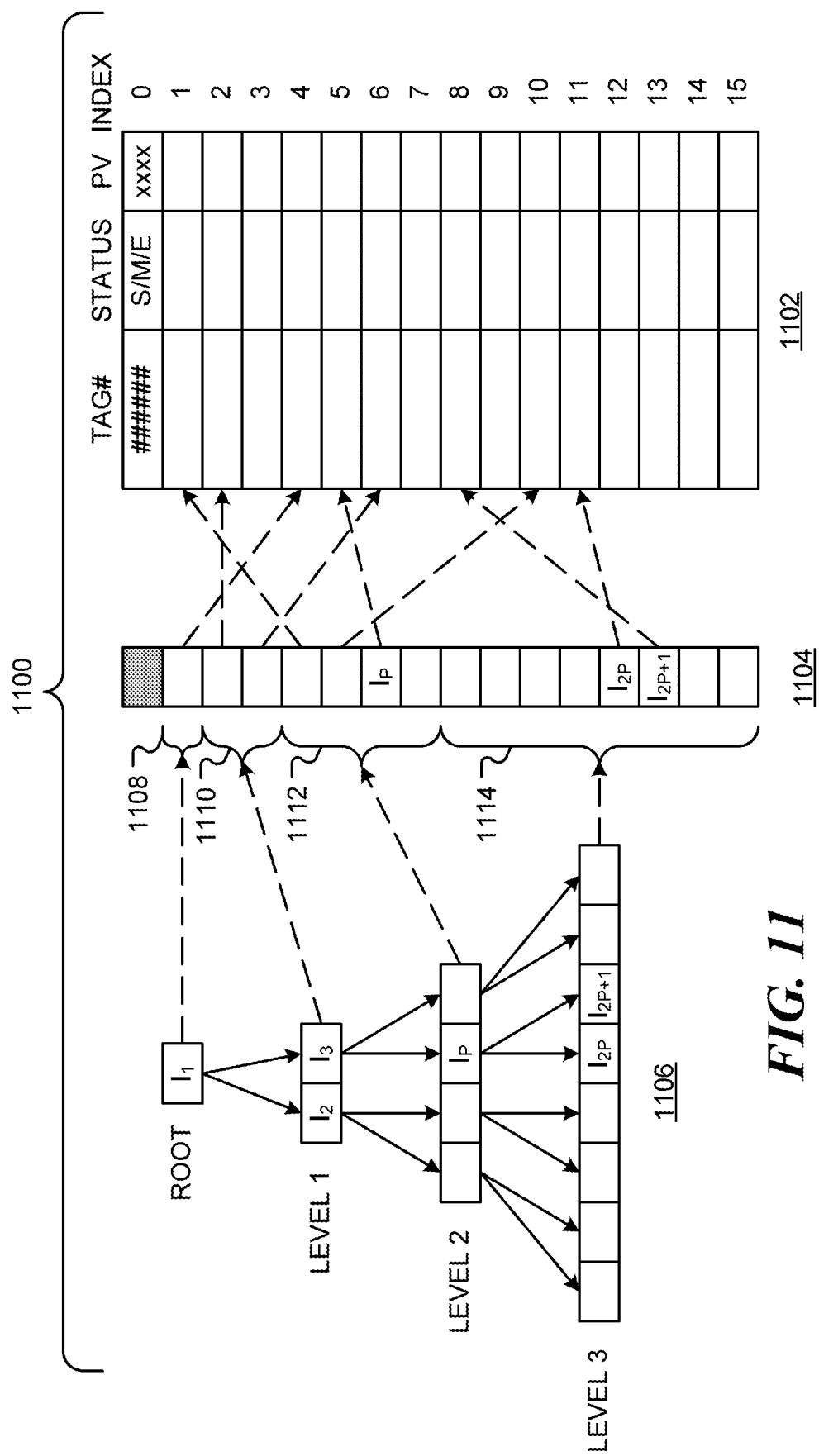
FIG. 11 is a diagrammatic representation of a tag array search structure organized as a binary search tree.

FIG. 11 is a diagrammatic representation of a tag search structure 1100 in accordance with embodiments of the disclosure. The structure 1100 comprises first memory 1102 for storing a tag directory and second memory 1104 for storing a tree array. Tag directory memory 1102 may be a content addressable memory (CAM), for example, to enable rapid lookup of tag values and their associated coherence states. Tree array memory 1104 stores indexes ($I_p$) to rows of CAM 1102.

Logically, the elements in tree array memory 1104 are arranged as a binary search tree (BST) 1106. As shown, the binary search tree has a root and three levels but, as discussed above, a tree may contain many more nodes in a given application. Binary search tree 1106 may be formed as balanced BST. This minimizes the size of memory 1104 needed to store the node values.

Each node is associated with an index that, in turn, is associated with an address tag stored in CAM 1102. In addition, each node, called a parent node, is logically connected, as indicated by the arrows in structure 1106, to a left-child node and a right-child node where the left-child node is associated with a smaller tag value than the parent node and the right-child node is associated with a larger tag value than the parent node. This property enables the tree to be searched rapidly. In the arrangement depicted in FIG. 11, the node at position p in the tree (with index $I_p$) is a parent to a left-child node at position 2p (with index $I_{2p}$) and a right-child node at position 2p+1 (with index $I_{2p+1}$). The root index is stored at location 1108 in the tree array memory 1104, level 1 of the tree is stored at locations 1110, level 2 of the tree is stored at locations 1112, and level 3 of the tree is stored at locations 1114.

CAM 1102 stores tag values (TAG #) of cache lines stored in one or more caches of the system. Associated with each cache line are coherence status bits (STATUS) and, optionally, a presence vector (PV). The presence vector indicates which cache or caches have a copy of the cache line. Each element of tree array memory 1104 stores an index to a line in CAM 1102. For example, $I_p=5$, $I_{2p}=11$ and $I_{2p+1}=8$, indicating the tag stored at index 5 is greater than the tag value stored at index 11 and less the tag value stored at index 8.

To search the tree 1100 for a particular address tag, the address tag is compared to a tag at the root node, if a match is found, a line of data with that address tag is cached and the coherence state and location may be retrieved from the tag array entry. If the address tag is less than the address tag at the root the left child is selected. If the address tag is greater than the address tag at the root the right child is selected. This search process continues for successive nodes until a match is found or a leaf node is reached. If a leaf node (a node with no child node) is reached without match being found, the line associated with the searched address tag is not cached in the system.

Other tag address search structures may be used, such as a hash filter.

Figure 12:
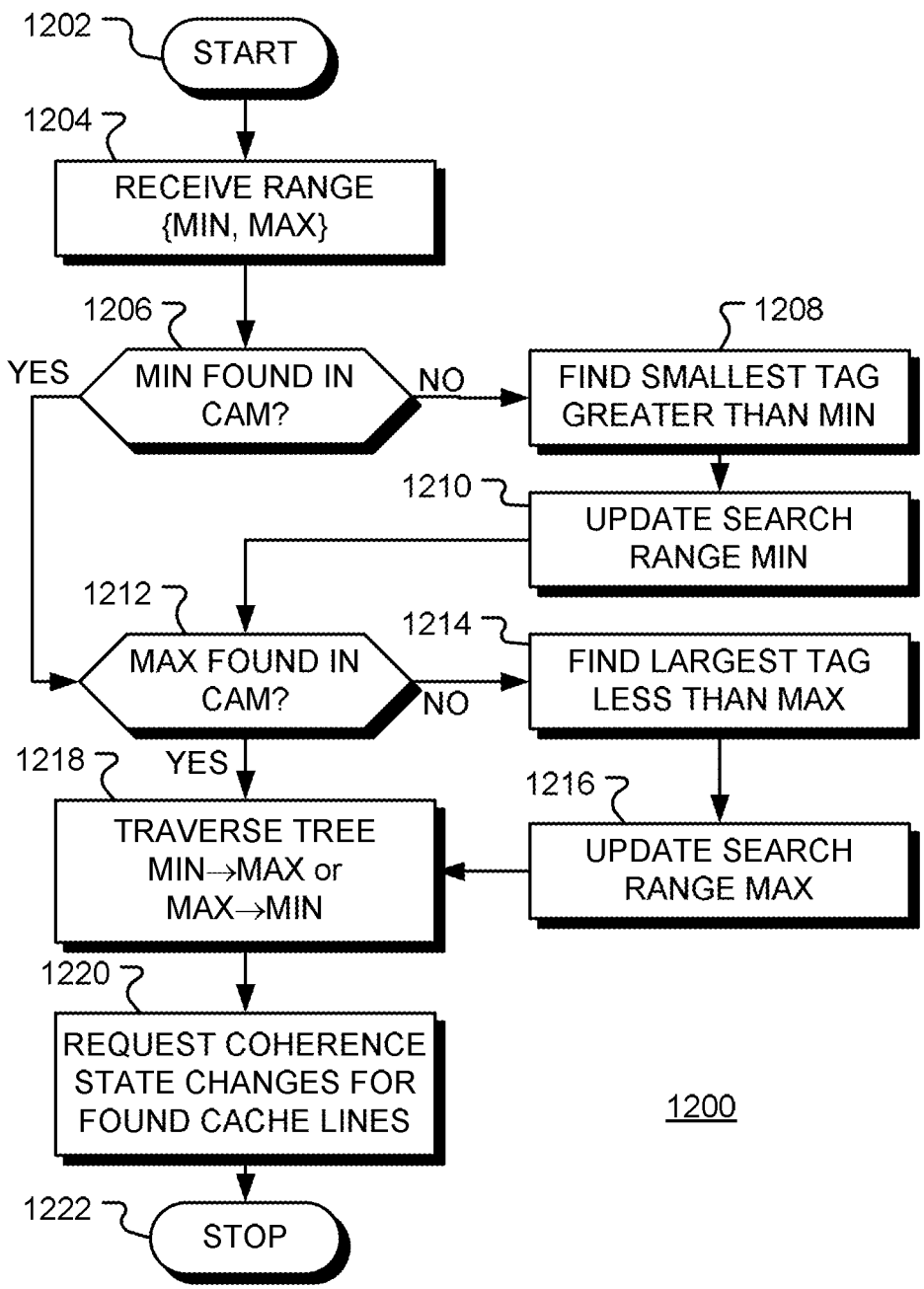
FIG. 12 is a flow chart of a method for modifying coherence states in a data processing apparatus, consistent with embodiments of the disclosure.

FIG. 12 is a flow chart of a method 1200 for modifying coherence states in a data processing apparatus, consistent with embodiments of the disclosure. Following start block 1202, a coherency controller of the data processing apparatus receives a request from an external, out-of-coherency device, such as a data movement engine at block 1204. The request includes indicators of a range of addresses for which a change in coherence state is requested. The indicators may be start and end addresses (or start and end address tags), or a start address and a length, for example. The indicators enable minimum (MIN) and maximum (MAX) address tag values of the range to be determined. Optionally, the request may also indicate the desired coherence state for data in the range. Alternatively, a default state (such as 'Invalid') may be assumed. The tag search structure is then used to identify address tags, in the range {MIN,MAX}, that match address tags in one or more caches of the system. In the example illustrated in flow chart 1200, a binary search tree is used.

At decision block 1206, the tag array (stored in a CAM for example) is accessed to see if the range minimum is stored in the memory. If a match is found, as depicted by the positive branch from decision block 1206, flow continues to decision block 1212. If no match is found, as depicted by the negative branch from decision block 1206, the tree is searched at block 1208 to find the smallest stored tag that is greater than the MIN value. The search range is updated with this value at block 1210 and flow continues to decision block 1212.

At decision block 1212, the tag array is searched to see if the range maximum value (MAX) is stored in the memory. If a match is found, as depicted by the positive branch from decision block 1212, flow continues to block 1218. If no match is found, as depicted by the negative branch from decision block 1212, the tree is searched at block 1214 to find the largest stored tag that is smaller than the MAX value. The search range is updated with this value at block 1216 and flow continues to block 1218.

The searches for the maximum and minimum values of tags stored in a cache may be performed serially or in parallel.

At this point, the maximum and minimum of tag values stored in a cache are known, as are node positions for these values. At block 1218 the tree is searched (either in parallel or sequentially) to identify all address tags in the updated range that are stored in the tag array and which require a coherence state update. At block 1220, messages are sent to all identified lines to initiate the requested coherence states changes, including lines within the local cache. The method terminates at block 1222.

In this manner, requests are sent only for those cache lines that exist in one or more caches of the system. This avoids sending modification request for all address tags within the range specified by the external device.

The integrated circuits disclosed above may be defined by a set of instructions of a Hardware Description Language (HDL). The instructions may be stored in a non-transient computer readable medium. The instructions may be distributed via the computer readable medium or via other means such as a wired or wireless network. The instructions may be used to control manufacture or design of the integrated circuit, and may be combined with other instructions.

Although illustrative embodiments of the invention have been described in detail herein with reference to the accompanying drawings, it is to be understood that the invention is not limited to those precise embodiments, and that various changes and modifications can be affected therein by one skilled in the art without departing from the scope and spirit of the invention as defined by the appended claims.

It will be appreciated that the devices, systems, and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. For example, performing X includes any suitable method for causing another party such as a remote user, a remote processing resource (e.g., a server or cloud computer) or a machine to perform X. Similarly, performing elements X, Y, and Z may include any method of directing or controlling any combination of such other individuals or resources to perform element X, Y, and Z to obtain the benefit of such steps. Thus method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It should further be appreciated that the methods above are provided by way of example. Absent an explicit indication to the contrary, the disclosed steps may be modified, supplemented, omitted, and/or re-ordered without departing from the scope of this disclosure.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the scope of this disclosure and are intended to form a part of the disclosure as defined by the following claims, which are to be interpreted in the broadest sense allowable by law.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

Accordingly, some features of the disclosed embodiments are set out in the following numbered items: To be added after claims finalized.

1. A method for modifying a coherence state of cached data in a coherent data processing system for which data coherency is maintained across a plurality of caches, the method comprising: maintaining a tag search structure that identifies address tags and coherence states of cached data in the coherent data processing system, where data in the plurality of caches is stored in cache lines indexed by address tags; and responsive to a request from a device external to the coherent data processing system to modify a coherence state of data associated with a range of addresses: accessing the tag search structure to identify address tags of cached data for which the coherence state is to be modified, where the address tags correspond to addresses within the range of addresses; and issuing requests in the data processing system to modify a coherence state of cached lines with the identified address tags, where the request from the external device comprises indicators of the range of addresses.

2. The method of item 1, where accessing the tag search structure to identify address tags of cached data for which the coherence state is to be modified comprises: accessing the tag search structure to identify a first address tag with a value that is smallest among all tag values that are greater than or equal to a minimum address tag of the range of addresses; accessing the tag search structure to identify a second address tag with a value that is the largest among all values that are less than or equal to a maximum address tag of the range of addresses; and accessing the tag search structure to identify address tags greater than or equal to the first address tag and less than or equal to the second address tag.

3. The method of item 2, where the request from the external device comprises an indicator of a desired modified coherence state.

4. The method of item 1, where maintaining the tag search structure comprises maintaining a search tree.

5. The method of item 1, where accessing the tag search structure to identify address tags of cached data for which the coherence state is to be modified comprises searching a balanced or unbalanced search tree.

6. The method of item 5, where the search tree is a binary tree, B-tree, an A-B tree, a ternary tree, a quad-tree or an oct-tree.

7. The method of item 5, where accessing the tag search structure comprises:
accessing a node of the search tree to retrieve an index; and accessing a directory of address tags in accordance with the index.

8. The method of item 5, where a key of the search tree comprises an address tag.

9. The method of item 1, where the tag search tree is implemented in a coherency controller, the method further comprising: modifying a coherence state of cached lines with the identified address tags within a lowest level cache associated with the coherency controller.

10. The method of item 1, further comprising: accessing presence vectors associated with the identified address tags, where issuing requests in the data processing system to modify the coherence state of cached lines with the identified address tags comprises issuing requests in accordance with the presence vector.

11. The method of item 1, where accessing the tag search structure to identify address tags of cached data for which the coherence state is to be modified comprises accessing a content addressable memory.

12. A data processing apparatus comprising: an interconnect circuit configured to connect a plurality of processing cores and a shared storage resource in a coherent network, where each processing core has access to one or more caches of a plurality of caches, and where data in the plurality of caches is stored in cache lines indexed by address tags; and a coherency controller configured to control data coherency in the coherent network and maintain a record of address tags and coherence states of data stored in one or more caches of the plurality of caches; where the coherency controller is configured for: searching the record of address tags and coherence states responsive to a request from a device external to the coherent network, the request comprising indicators of a range of addresses; identifying address tags of cached data for which a coherence state is to be modified, where the address tags correspond to addresses within the range of addresses; identifying network locations in the coherent network of the one or more caches; and issuing requests to the identified network locations to modify a coherence state of cached lines with the identified address tags.

13. The data processing apparatus of item 12, further comprising a tag search structure, where the record of address tags and coherence states is stored in a first memory of the tag search structure.

14. The data processing apparatus of item 13, where the tag search structure comprises a search tree stored in a second memory of the tag search structure.

15. The data processing apparatus of item 13, where the first memory comprises a content addressable memory (CAM), and where the record of address tags and coherence states is stored in the CAM.

16. The data processing apparatus of item 15, where the tag search structure comprises a search tree and where a node of the search tree is associated with an index into the CAM.

17. The data processing apparatus of item 15, where an entry in the CAM is configured to store an address tag of a cached line in one or more caches of a plurality of caches and a coherence status of the cached line.

18. The data processing apparatus of item 17, where an entry in the CAM is further configured to store a presence vector of the cache line.

19. The data processing apparatus of item 12, where the data processing apparatus comprises a plurality of addressable elements addressable in a real address space and where the plurality of processing cores operate in a virtual address spaces, the data processing apparatus further comprising: a range table buffer configured to translate an address in a virtual address space to and address in the system address space in accordance with a range table; and a memory node controller configured to translate an address in the system address space to a physical address in the shared storage resource; where the address tags correspond to addresses in the real address space; and where the range of addresses indicated in the request comprises a range of address in the real address space.

20. The data processing apparatus of item 12, where the plurality of processing cores operate in a virtual address spaces, the data processing apparatus further comprising: a page table memory configured to stored mappings between virtual address pages in the virtual address space and physical address pages in the shared storage resource, where the address tags correspond to addresses in the physical address space.

21. The data processing apparatus of item 20, further comprising: a translation lookaside buffer, configured to store recent mappings between virtual address pages and physical address page in the shared storage resource, where the page table memory is searched when the address in the mapping between the virtual address page and the physical address page is not stored in the translation lookaside buffer.

What is claimed is:

1. A method for modifying a coherence state of cached data in a coherent data processing system for which data coherency is maintained across a plurality of caches, the method comprising:
   maintaining a tag search structure that identifies address tags and coherence states of cached data in the coherent data processing system, where data in the plurality of caches is stored in cache lines indexed by address tags; and
   responsive to a request from a device external to the coherent data processing system to modify a coherence state of data associated with a range of addresses:
      accessing the tag search structure to identify address tags of cached data for which the coherence state is to be modified, where the address tags correspond to addresses within the range of addresses; and
      issuing requests in the data processing system to modify the coherence state of cached lines to be modified with the identified address tags,
   where the request from the external device comprises indicators of the range of addresses.

2. The method of claim 1, where accessing the tag search structure to identify address tags of cached data for which the coherence state is to be modified comprises:
   accessing the tag search structure to identify a first address tag with a value that is smallest among all tag values that are greater than or equal to a minimum address tag of the range of addresses;
   accessing the tag search structure to identify a second address tag with a value that is the largest among all values that are less than or equal to a maximum address tag of the range of addresses; and
   accessing the tag search structure to identify address tags greater than or equal to the first address tag and less than or equal to the second address tag.

3. The method of claim 2, where the request from the external device comprises an indicator of a desired modified coherence state.

4. The method of claim 1, where maintaining the tag search structure comprises maintaining a search tree.

5. The method of claim 1, where accessing the tag search structure to identify address tags of cached data for which the coherence state is to be modified comprises searching a balanced or unbalanced search tree.

6. The method of claim 5, where the search tree is a binary tree, B-tree, an A-B tree, a ternary tree, a quad-tree or an oct-tree.

7. The method of claim 5, where accessing the tag search structure comprises:
accessing a node of the search tree to retrieve an index; and
accessing a directory of address tags in accordance with the index.

8. The method of claim 5, where a key of the search tree comprises an address tag.

9. The method of claim 1, where the tag search tree is implemented in a coherency controller, the method further comprising:
modifying a coherence state of cached lines with the identified address tags within a lowest level cache associated with the coherency controller.

10. The method of claim 1, further comprising:
accessing presence vectors associated with the identified address tags,
where issuing requests in the data processing system to modify the coherence state of cached lines with the identified address tags comprises issuing requests in accordance with the presence vector.

11. The method of claim 1, where accessing the tag search structure to identify address tags of cached data for which the coherence state is to be modified comprises accessing a content addressable memory.

12. A data processing apparatus comprising:
an interconnect circuit configured to connect a plurality of processing cores and a shared storage resource in a coherent network, where each processing core has access to one or more caches of a plurality of caches, and where data in the plurality of caches is stored in cache lines indexed by address tags; and
a coherency controller configured to control data coherency in the coherent network and maintain a record of address tags and coherence states of data stored in one or more caches of the plurality of caches;
where the coherency controller is configured for:
searching the record of address tags and coherence states responsive to a request from a device external to the coherent network, the request comprising indicators of a range of addresses;
identifying address tags of cached data for which a coherence state is to be modified,
where the address tags correspond to addresses within the range of addresses;
identifying network locations in the coherent network of the one or more caches; and
issuing requests to the identified network locations to modify the coherence state of cached lines to be modified with the identified address tags.

13. The data processing apparatus of claim 12, further comprising a tag search structure, where the record of address tags and coherence states is stored in a first memory of the tag search structure.

14. The data processing apparatus of claim 13, where the tag search structure comprises a search tree stored in a second memory of the tag search structure.

15. The data processing apparatus of claim 13, where the first memory comprises a content addressable memory (CAM), and where the record of address tags and coherence states is stored in the CAM.

16. The data processing apparatus of claim 15, where the tag search structure comprises a search tree and where a node of the search tree is associated with an index into the CAM.

17. The data processing apparatus of claim 15, where an entry in the CAM is configured to store an address tag of a cached line in one or more caches of a plurality of caches and a coherence status of the cached line.

18. The data processing apparatus of claim 17, where an entry in the CAM is further configured to store a presence vector of the cache line.

19. The data processing apparatus of claim 12, where the data processing apparatus comprises a plurality of addressable elements addressable in a real address space and where the plurality of processing cores operate in a virtual address spaces, the data processing apparatus further comprising:
a range table buffer configured to translate an address in a virtual address space to and address in the system address space in accordance with a range table; and
a memory node controller configured to translate an address in the system address space to a physical address in the shared storage resource;
where the address tags correspond to addresses in the real address space; and
where the range of addresses indicated in the request comprises a range of address in the real address space.

20. The data processing apparatus of claim 12, where the plurality of processing cores operate in a virtual address spaces, the data processing apparatus further comprising:
a page table memory configured to stored mappings between virtual address pages in the virtual address space and physical address pages in the shared storage resource,
where the address tags correspond to addresses in the physical address space.

21. The data processing apparatus of claim 20, further comprising:
a translation lookaside buffer, configured to store recent mappings between virtual address pages and physical address page in the shared storage resource,
where the page table memory is searched when the address in the mapping between the virtual address page and the physical address page is not stored in the translation lookaside buffer.

* * * * *